United States Patent [19]

Geus et al.

[11] Patent Number: 4,740,360

[45] Date of Patent: Apr. 26, 1988

[54] PROCESS FOR PREPARING SUPPORTED CATALYST SYSTEMS

[75] Inventors: John W. Geus, Bilthoven; Peter C. M. Van Stiphout, Helmond; Frederik Versluis, Lopik, all of Netherlands

[73] Assignee: Harshaw Chemie B.V., De Meern, Netherlands

[21] Appl. No.: 930,117

[22] Filed: Nov. 12, 1986

[30] Foreign Application Priority Data

Nov. 11, 1985 [NL] Netherlands ......................... 8503090

[51] Int. Cl.$^4$ .............................................. C01G 37/00
[52] U.S. Cl. .......................................... 423/55; 423/66; 423/87; 427/126.3; 427/126.2; 427/126.6; 427/126.1; 204/86; 204/96
[58] Field of Search ................... 204/86, 96, 115, 291; 427/126.3, 126.4, 126.6, 126.2, 126.1; 423/55, 66, 87

[56] References Cited

U.S. PATENT DOCUMENTS 3,873,368 3/1975 Pickett ............................... 204/115
4,443,305 4/1984 Haynes ........................... 204/105 R

*Primary Examiner*—R. L. Andrews
*Attorney, Agent, or Firm*—Woodcock Washburn Kurtz Mackiewicz & Norris

[57] ABSTRACT

Carrier supported catalysts are prepared, comprising metal ions which in their most stable state occur as anions or as higher-valency cations which exhibit a poor interaction with the support material by deposition-precipitation through increasing the hydroxyl ion concentration in homogeneous solution. According to the invention, prior to deposition-precipitation the metal ions are electrochemically reduced to soluble metal ions having a lower valency. Preferably, the pH value of a suspension of the support to be loaded in a solution of the electrochemically reduced metal ions is homogeneously increased by hydrolysis of compounds such as urea or isocyanate, or by the controlled injection of an alkaline solution below the surface of the suspension.

14 Claims, No Drawings

PROCESS FOR PREPARING SUPPORTED CATALYST SYSTEMS

BACKGROUND OF THE INVENTION

The present invention relates to a process for preparing catalysts, which comprises depositing an active component or a compound to be converted to the active component ("precursor") on a supporting material by means of deposition-precipitation.

In solid catalysts the area of the active surface per unit volume of the catalyst and the accessibility of this surface to reactants are decisive of the activity and selectivity. In general, catalysts to be technically used must have a good stability. This means that the active material may not sinter at the temperatures at which the thermal pretreatment and the catalytic reaction take place. Because substantially all the catalytically active materials sinter rapidly at elevated temperatures, the active material is often applied to a so-called support.

The support, which is generally not catalytically active itself, is thermostable and therefore does not sinter at high temperatures. The specific area and the porous structure of the support are adapted to the catalytic reaction to be conducted, if possible. As far as catalytic reactions are concerned in which especially the activity at low temperature is important, the largest possible active surface area per unit volume of the catalyst is aimed at. In those cases the process is carried out with a highly porous support, the active material is finely and homogeneously distributed over the surface of the support with a high degree of loading. There are cases in which minute active particles show a relatively low activity per unit area. In those situations somewhat larger particles will preferably be applied to the surface of the support. This also applies if the selectivity of minute particles is unfavourable. In other catalytic reactions in which the selectivity is of decisive significance, wide-pored supports having a smaller specific surface area have proved to be superior. In all cases, however, a uniform, compact distribution of the active particles over the surface of the support is highly favourable.

There is a marked need for a process which renders it possible to apply catalytically active particles or precursors thereof having controllable sizes to the surface of supports in a uniformly distributed and highly compact state. To this end, the method of deposition-precipitation giving excellent results was developed previously. For extensive descriptions of this method reference is made to: A. J. van Dillen, J. W. Geus, L. A. M. Hermans and J. van der Meijden in Proceedings Sixth International Conference and Catalysis London (1976) and L. A. M. Hermans and J. W. Geus in Preparation of Catalysts II (B. Delmon, P. Grange, P. Jacobs and G. Poncelet, editors), pages 113–130, Elsevier, Amsterdam (1979). In deposition-precipitation the concentration of an insoluble (precursor of a) catalytically active component in a suspension of the support is homogeneously increased. If nucleation of the insoluble (precursor of the) catalytically active component preferentially proceeds on the surface of the suspended support, the homogeneous increase of the concentration leads to precipitation of (the precursor of) the active material on the support only. By controlling the amount of the (precursor of the) active component to be precipitated per unit area of the support, the sizes of the particles deposited on the support can be controlled.

A condition for obtaining deposition-precipitation is a sufficiently strong interaction of the material to be precipitated with the surface of the support; this is necessary for effecting preferential nucleation on the surface of the support. In order to establish whether the precipitation proceeds only on the support, the variation of the concentration of the compounds to be precipitated can be monitored during precipitation from homogeneous solution with and without a suspended support. If the concentration is lower during (the beginning of) the precipitation in the presence of a suspended support, the interaction with the surface of the support is sufficient to lead to selective nucleation on the surface of the support.

In a large number of cases the desired deposition-precipitation can be realized by homogeneously increasing the hydroxyl ion concentration of a suspension of the support. The pH value can be readily increased, also on a technical scale, e.g., by hydrolyzing urea or isocyanate. This is also possible by injecting a solution of alkaline reaction below the surface of a suspension of a support at an appropriate velocity.

A number of catalytically important elements or compounds, however, cannot be precipitated on to the support in the desired manner by increasing the pH value of a suspension of the support in a solution of the catalytically active precursor. This particularly applies to metal ions the stable form of which has such a high charge that they occur as oxy anions. Examples are vanadates, molybdates, tungstates and antimonates. By increasing the pH value of a solution of these ions, these anions, of course, do not precipitate. These anions can be precipitated by pH reduction; the pH can be homogeneously reduced by injection of an acid solution below the surface of a suspension of the support. In a number of important cases, however, there is no sufficient interaction with the surface of the suspended support. This poor interaction especially occurs with silica and silica/alumina supports.

There is therefore a need for a process which renders it possible to precipitate metal ions occurring in the stable form as anions on to/the support by increasing the pH value of a suspension of the support.

SUMMARY OF THE INVENTION

According to the invention metal ions which in their most stable state occur as anions or as higher-valency cations are precipitated from a homogeneous solution only on to the surface of the support through increasing the pH value of a suspension of the support, by previously reducing said ions electrochemically to form soluble metal ions having a lower valency.

Reduction of the valency of metal ions leads to an appreciable decrease of the acid character, and the metal ions are going to exhibit an alkaline reaction. A change of the valency also leads to an appreciable increase in the interaction with supports such as silica. The electric voltage to be applied in the reduction and the range of pH values at which the desired valency can be adjusted without precipitating the metal ions can be read from so-called Pourbaix diagrams. See in this respect M. Pourbaix, Atlas d'équilibres électrochimiques. Gauthier-Villars, Paris (1963).

DETAILED DESCRIPTION OF THE INVENTION

Of course, reoxidation of the metal ions after the electrochemical reduction must be avoided. In order to avoid oxidation by atmospheric oxygen the reduction is preferably effected under an inert gas or in a stream of inert gas. The solution of the reduced metal ions can be transferred to a precipitation vessel under an inert gas, the support suspended in the solution, and the deposition-precipitation on to the carrier effected by increasing the pH value of the suspension. In addition to oxidation by atmospheric oxygen, also oxidation by dissolved ions should be avoided. Nitrite and nitrate ions are less attractive in this connection. In order to prevent oxidation and redissolution of the material precipitated on the support, also the separation of the loaded support from the liquid is preferably effected under an inert gas.

The process according to the invention can be used for the preparation of catalysts in which a metal or metal oxide is present, but it is also very suitable for use in the preparation of catalysts in which a composition or compound of several metals or metal oxides is present.

The deposition-precipitation of the reduced metal ions can be effected in a known manner. Thus, excellent results are obtained with the hydrolysis of urea or isocyanate. If necessary, the process can be carried out at elevated pressure; in that case use can be made of a higher temperature at which the hydrolysis proceeds more rapidly. Also injection of an alkaline solution below the surface of the suspension of the support leads to good results.

The invention is illustrated in and by the following examples.

EXAMPLE I

Preparation of Vanadium (III)

(A) A porous-porcelain cylindrical vessel having a closed bottom was disposed in the middle of a 1.5 l electrolytic vessel made of pyrex glass. This porous vessel contained a carbon electrode serving as an anode during electrolysis. Provided on the outside of the porous pot was a hollow tubular lead electrode through which a stream of cooling water was passed.

To exclude atmospheric oxygen a stream of nitrogen was passed through the electrodes introduced into the electrolytic vessel. The top of the electrolytic vessel was closed. The fluid in the electrolytic vessel could be vigorously stirred with a magnetic stirrer.

In addition to the energized electrodes a pH electrode, a calomel, and a platinum electrode were placed in the solution. With the last electrode the potential of the solution was monitored.

To prepare vanadium(III) 0.4 mole $VOSO_4.5H_2O$ (Merck p.a.) was dissolved in the above vessel in about 700 ml boiled and then cooled demineralized water. The pH of the solution was adjusted to 0.5 with concentrated sulfuric acid. Deionized water was introduced into the porous pot. This water was acidified with sulfuric acid, until further acidification no longer affected the amperage. During reduction the amperage was about 2.1 A, the voltage 8.2 V. In this case the efficiency of the electrolysis to trivalent vanadium was 51%.

The process was repeated, and now a voltage of 2.8 V was applied, which resulted in an amperage of 0.5 A. Now a current efficiency of 54% was obtained.

To enable spectroscopically following the formation of vanadium ions of lower valencies, the process was also carried out at a lower concentration. Now the absorption was low enough to render spectroscopic transmission measurements possible.

During electrolysis the colour of the solution changed from blue, characteristic of $VO^{++}$, to green, which is characteristic of $V^{+++}$. When the reduction was continued for a long time, there was also formed a little V(II) in addition to V(III). It turned out that the presence of bivalent vanadium increased the sensitivity to atmospheric oxygen. In that case V(IV) was indicated in the solution. As described in the literature, bivalent vanadium proved to be easily decomposable at platinum as a catalyst.

Finally, the process was once more repeated, but now platinum electrodes were used. The results then obtained were excellent.

(B) Precipitation of vanadium(III)

The solution obtained under A) was transferred to a reaction vessel with the exclusion of atmospheric oxygen, and a 0.6 molar ammonia solution was injected at a rate of 0.15 ml/min while vigorously stirring and passing nitrogen through the vessel.

When the pH value of the solution was increased the conversion of V(III) to soluble $VOH^{++}$ was observed spectrophotometrically. The colour of the solution changed from green to yellow-brown. The subsequent reaction to $VO^{++}$ resulted in the solution turning green again. At a pH value of 5 the precipitation of a green solid proceeded.

EXAMPLE II

Precipitation of $V_2O_3$ on a silica support.

To a solution produced as described in Example I A, so much silica (Degussa, FRG, specific surface area 200 m$^2$/g) was added as to result in a degree of loading of 25% by weight of $V_2O_3$. To this suspension of silica in the vanadium(III) solution an ammonia solution was added in the manner described in Example I (B). In this way a supported catalyst loaded with vanadium trioxide was obtained which, depending on the use, was processed further, applying a known method.

In the presence of silica the pH values at which, as appears from spectroscopic observations, the concentrations of $VOH^{++}$ and $VO^+$ are highest, shifted to lower values. This was an indication of the contemplated interaction of the precipitating vanadium ions with the silica. For $VOH^{++}$ the maximum shifted from a pH value of 3.9 to a value of 3.15 and for $VO^+$ from 5 to 3.5.

EXAMPLE III

In this example it is shown that the process according to the invention is very suitable for use in the preparation of catalysts in which a composition or compound of several oxides is present.

100 ml of a vanadium(III) solution (about 0.03 mole), which was prepared as described in Example I (A), were introduced into a precipitation vessel and supplemented under nitrogen with 200 ml boiled water. The pH was adjusted to a value of 1.0 with concentrated sulfuric acid, and then 1.88 g $NiSO_4.6H_2O$ were dissolved.

Subsequently, with vigorous stirring, 0.4 molar ammonia was injected at a rate of 0.20 ml/min until a pH value of 8 was obtained. Then everything had precipitated. The precipitate was filtered and washed with hot water, while oxidation was prevented. Subsequently, the precipitate was dried at 110° C. for 24 h, then powdered and once more dried for 24 h at 120° C. Thus a silica-supported nickel oxide/vanadium oxide catalyst was obtained.

EXAMPLE IV 150 ml of a vanadium(III) solution (0.045 mole) prepared as described in Example I (A), were introduced into a precipitation vessel and supplemented with boiled deionized water to 200 ml. Subsequently, 12.78 g NiSO$_4$.6H$_2$O were dissolved, and then 6.42 g silica (Aerosil, Degussa, FRG, 200 m$^2$/g) were suspended in the solution.

With vigorous stirring, 0.6 molar ammonia was then injected at a rate of 0.15 ml/min until a pH value of 8 was obtained.

The thus loaded support was filtered, washed with hot water, dried for 24 h, powdered and finally once more dried for 24 h. Drying was effected at 120° C. In this way an Ni/V$_2$O$_3$/SiO$_2$ catalyst was obtained.

EXAMPLE V

An Fe/V$_2$O$_3$/SiO$_2$ catalyst was prepared using the process as described in Example IV, but starting from 13.5 g FeSO$_4$.7H$_2$O.

We claim:

1. A process for applying a metal compound to a catalyst support, comprising:
    (a) providing a solution comprising a plurality of high valency ions of a metal;
    (b) applying a voltage to said solution for reducing said high valency ions to form soluble ions of said metal, said soluble ions having a lower valency; and
    (c) contacting the resulting solution with said catalyst support; and
    (d) depositing a metal compound containing said lower valency ions on said catalyst support by deposition-precipition.

2. The process of claim 1 wherein said depositing step (d) comprises increasing a concentration of hydroxyl ions of said metal in said solution.

3. The process of claim 2 where in step (c) said solution is contacted with an aqueous suspension of said catalyst support.

4. The process as claimed in claim 3, wherein said deposition step comprises increasing the pH value of said suspension by hydrolysis of urea or isocyanate.

5. The process as claimed in claim 3, wherein said deposition step comprises increasing the pH value of said suspension by controlled injection of an alkaline solution below the surface of the suspension.

6. The process as claimed in claim 3, further comprising removing the support from said solution after said deposition step in the absence of oxygen.

7. The process of claim 1 wherein said metal ions are selected from ions the stable forms of which occur as oxy anions.

8. The process of claim 7 where said metal ions are stable forms of vanadates, molybdates, tungstates and antimonates or a combination thereof.

9. The process as claimed in claim 1, wherein said disposing step comprises deposition-precipitation of said metal compound in an inert gas atmosphere.

10. The process as claimed in claim 1, wherein said deposition step is conducted in a separate precipitation vessel.

11. The process of claim 1 wherein said high valency ions are high valency cations of said metal.

12. The process of claim 1 wherein said high valency ions are anions of said metal.

13. The process of claim 1 where said catalyst support is made of silica, alumina or a combination thereof.

14. A process for applying a metal compound to a catalyst support, comprising:
    (a) providing a solution comprising a plurality of high valency ions of a metal, said support being immersed in said solution;
    (b) applying a voltage to said solution for reducing said high valency ions to form soluble ions of said metal, said soluble ions having a lower valency; and
    (c) disposing a metal compound containing said lower valency ions on said catalyst support by deposition-precipitation.

* * * * *